(12) United States Patent
Gilar et al.

(10) Patent No.: US 12,247,962 B2
(45) Date of Patent: Mar. 11, 2025

(54) MICRO SOLID PHASE EXTRACTION DEVICES AND METHODS

(71) Applicant: Waters Technologies Corporation, Milford, MA (US)

(72) Inventors: Martin Gilar, Franklin, MA (US); Thomas S. McDonald, Littleton, MA (US); Joseph D. Michienzi, Plainville, MA (US); Jeffrey Musacchio, Sharon, MA (US); Rachel Mumma, Mullica Hill, NJ (US); Keith Fadgen, Hope Valley, RI (US); Geoff C. Gerhardt, Woonsocket, RI (US)

(73) Assignee: Waters Technologies Corporation, Milford, MA (US)

( * ) Notice: Subject to any disclaimer, the term of this patent is extended or adjusted under 35 U.S.C. 154(b) by 741 days.

(21) Appl. No.: 17/057,242

(22) PCT Filed: May 20, 2019

(86) PCT No.: PCT/IB2019/054161
§ 371 (c)(1),
(2) Date: Nov. 20, 2020

(87) PCT Pub. No.: WO2019/224701
PCT Pub. Date: Nov. 28, 2019

(65) Prior Publication Data
US 2021/0199630 A1 Jul. 1, 2021

Related U.S. Application Data

(60) Provisional application No. 62/674,146, filed on May 21, 2018.

(51) Int. Cl.
*G01N 30/60* (2006.01)
*G01N 30/00* (2006.01)
*G01N 30/06* (2006.01)

(52) U.S. Cl.
CPC ......... *G01N 30/6091* (2013.01); *G01N 30/06* (2013.01); *G01N 2030/009* (2013.01); *G01N 2030/062* (2013.01)

(58) Field of Classification Search
CPC .............. G01N 30/6091; G01N 30/06; G01N 2030/009; G01N 2030/062
See application file for complete search history.

(56) References Cited

U.S. PATENT DOCUMENTS 3,487,938 A * 1/1970 Patterson ........... G01N 30/6021
96/105
3,762,407 A * 10/1973 Shonerd ................... A62B 7/02
128/205.21

(Continued)

FOREIGN PATENT DOCUMENTS

CN 1895717 A 1/2007
DE 20201603304 * 9/2016 ............. G01N 30/06
DE 202016103304 U1 9/2016

OTHER PUBLICATIONS

Fontanals et al. "Overview of the novel sorbents available in solid-phase extraction to improve the capacity and selectivity of analytical determinations." Contrib. Sci. 6(2010): 199-213.

(Continued)

*Primary Examiner* — Alexander Satanovsky
*Assistant Examiner* — Sarah Zaab
(74) *Attorney, Agent, or Firm* — WOMBLE BOND DICKINSON (US) LLP; Deborah M. Vernon; Mark R. Deluca (57) ABSTRACT

Methods and devices for the washing, extraction, and separation of a sample in a disposable chromatography cartridge (201) comprising a barrel (204) and a column (205), and especially including reinforcement to the column permitting high-pressure separation.

20 Claims, 8 Drawing Sheets

(56) References Cited

U.S. PATENT DOCUMENTS

| | | | | |
|---|---|---|---|---|
| 4,563,275 A * | 1/1986 | McEachern | ........ | G01N 30/6091 |
| | | | | D24/232 |
| 5,198,115 A * | 3/1993 | Stalling | ................ | G01N 30/467 |
| | | | | 210/634 |
| 5,863,428 A * | 1/1999 | Ma | ........................ | B01D 15/22 |
| | | | | 96/101 |
| 6,074,556 A * | 6/2000 | Van Davelaar | ........ | B01D 15/08 |
| | | | | 210/656 |
| 7,722,820 B2 | 5/2010 | Gjerde et al. | | |
| 2006/0019407 A1 | 1/2006 | Fulton et al. | | |
| 2010/0081209 A1 | 4/2010 | Brewer | | |
| 2011/0133077 A1 | 6/2011 | Henion et al. | | |
| 2016/0252435 A1 | 9/2016 | Sasano | | |
| 2017/0282096 A1* | 10/2017 | Bouvier | ................ | B01D 15/20 |
| 2017/0292123 A1 | 10/2017 | Greiler et al. | | |

OTHER PUBLICATIONS

Hahn et al. "Comparison of protein A affinity sorbents." J. Chromatogr. B. 790(2003): 1-2.

International Search Report and Written Opinion issued in PCT Application No. PCT/IB2019/054161 mailed Oct. 8, 2019.

International Search Report and Written Opinion issued in PCT Application No. PCT/IB2019/054162 mailed Dec. 9, 2019.

Medina-Casanellas et al. "Preparation and evaluation of an immunoaffinity sorbent with Fab' antibody fragments for the analysis of opioid peptides by on-line immunoaffinity solid-phase extraction capillary electrophoresis-mass spec." Anal. Chim. Acta. 789(2013): 91-99.

* cited by examiner

MICRO SOLID PHASE EXTRACTION DEVICES AND METHODS

RELATED APPLICATIONS

This application claims priority to and benefit of international application no. PCT/IB2019/054161 filed on May 20, 2019 entitled "Micro Solid Phase Extraction Devices and Methods," and U.S. provisional patent application No. 62/674,146 filed on May 21, 2018 entitled "Micro Solid Phase Extraction Devices and Methods," the entire contents of each of which is incorporated herein by reference in their entirety.

FIELD OF THE INVENTION

The present technology generally relates to devices and methods for performing sample preparation (e.g., sample cleanup, concentration, extraction) and separation, and in particular, sample preparation and separation using micro solid phase extraction (μSPE) devices having tailored cartridges to permit high-pressure (e.g., 5000 psi or above) separations.

BACKGROUND

Sample preparation plays a major role in analyzing complex samples, such as biological samples. For example, blood contains a high concentration of proteins and lipids that can be detrimental for chromatographic and/or MS analysis. Therefore, sample clean-up (e.g. washing), extraction (e.g., concentrating) and separation from a complex sample are needed before analysis.

Microfluidic liquid chromatography (μLC) is often utilized for trace and high-sensitivity analysis. μLC can be performed on very small samples, and may be particularly relevant where larger volumes of sample are unavailable or prohibitively expensive. Traditional sample preparation methods such as solid phase extraction (SPE), protein precipitation (PP), liquid-liquid extraction (LLE), and dialysis may start with as much as 0.2-1 mL of sample, which may be diluted during processing up to a total volume of 0.5-10 mL. These "bulky" sample prep methods have limited compatibility with μLC, because they require an amount of sample that is otherwise unnecessary for μLC, which introduces waste and excess cost, and where sufficient sample is unavailable, may preclude the analysis.

SUMMARY

Provided herein are devices and methods for performing washing, extraction, and separation of a sample in a cartridge. In particular, devices and methods are described such that a cartridge may be used to perform a high-pressure separation (e.g., at or above 5000 psi, such as 10000 psi, 12000 psi, 15000 psi, or greater). In some embodiments, the cartridge structure is tailored to allow for off-line sample loading and on-line elution. And in some embodiments, the cartridge structure is tailored such that each sample well or cartridge can be eluted without unnecessary sample dilution and/or dispersion.

One aspect of the present technology is directed to a method for the washing, extraction, and separation of a sample in a chromatography cartridge comprising a barrel and a column. The method includes: adding a sample to the barrel; adding a portion of solvent to the barrel to wash the sample; loading at least a portion of the sample onto the column; creating a first connection between a mobile phase source and a first end of the column, such that the connection bypasses the barrel, and a second connection between an outlet line and a second end of the column, and pressuring a mobile phase flow from the mobile phase source though the column to the outlet line. In some embodiments, the mobile phase flow can be pressurized above about 5000 psi. (e.g., 6000 psi, 7000 psi, 8000 psi, 9000 psi, 10000 psi, 11000 psi, 12000 psi, 13000 psi, 14000 psi, 15000 psi, 16000 psi, 17000 psi, 18000 psi, 19000 psi, 20000 psi). In some embodiments, the outlet line is in direct fluidic connection with a liquid chromatography column. Alternatively, the outlet line can be in direct fluidic connection with a detector.

Another aspect of the present technology is directed to a cartridge for use in the washing and separation of a sample. In some embodiments, the structure of the cartridge is tailored to provide on-line elution. In an embodiment, the cartridge includes a barrel having a barrel first end that is open and a barrel second end opposite the barrel first end; a column segment, having a column segment first end connected to the barrel second end and a column segment second end opposite the column segment first end; a column spanning the column segment, the column filled with a sorbent material and having a column first end in fluid communication with the barrel second end and a column second end opposite the column first end; and a mobile phase source port at the column segment first end and in fluid communication with the column first end.

The above aspect of the present technology can include one or more of the following features. The mobile phase source port may be configured to form a substantially pressure-tight connection. That is, in one or more embodiments, the mobile phase source port is adapted or has a structure that mates with the mobile phase source to provide a pressure-tight connection. The mobile phase source port may be configured to form a substantially pressure-tight connection to a line in fluid communication with a mobile phase source. The cartridge may comprise an eluate release port at the column segment second end and in fluid connection with the column second end. The cartridge may additionally include an eluate release port configured to form a substantially pressure-tight connection. The cartridge may additional include an eluate release port configured to form a substantially pressure-tight connection with a line in fluid communication with a detector.

Additional features of the above aspect of the technology may also be utilized. For example, the column segment of the cartridge can be reinforced to withstand pressures above about 5000 psi, such as at 10000 psi and above (e.g., 12000 psi, 15000 psi). The barrel and the column segment each may include a cylindrical portion that have collinear axes. The barrel can include a funnel portion. The funnel portion can be located between the barrel cylindrical portion and the column segment cylindrical portion. The funnel may aid in loading of the column. In some embodiments, the column segment is tapered or has a radius which decreases from the first end of the column segment to the second end of the column segment. The column includes a sorbent material, such as any one of C18, phenyl, C8, Bare Silica, Aminopropyl, Amide, Diol. Combinations of these sorbent materials can also be used within the column. The column segment can be formed of various different types of materials. For example, the column segment may be formed of a polymer, such as HDPE, PEEK, PA, PP, or PVDF. Alternatively, or additionally, the column segment can include other materials, such as metals or ceramics. For example, an outer portion of the column segment may be formed of a polymer, and a column inserted and secured within the outer portion can be formed of a metal or a polymer of a different type than the polymer forming the outer portion. The cartridge can include a jacket surrounding at least a portion of the column segment. The jacket can be formed of a polymer and/or a metal. In some embodiments, the jacket includes a pressurized liquid. The column segment can include a first frit at the column first end and a second frit at the column second end. The frits can secure the sorbent material within the column especially during high pressure operation. In some embodiments, the frits have a form factor and/or are provided/attached to the column such that the frits do not disperse eluting peaks, thereby maintaining chromatographic efficiency. In certain embodiments, the barrel, column segment and mobile phase source port are all configured to have a form factor such that none of the barrel, column segment and mobile phase source port substantially disperse eluting peaks and allow for maintaining of chromatographic efficiency.

Another aspect of the present technology is directed to a system utilizing extraction-separation chromatography cartridges, in which the system includes a well-plate comprising a plurality of cartridge wells; a first solvent supply configured to deliver a first solvent to a barrel portion of an extraction-separation chromatography cartridge within any of the plurality of cartridge wells; a mobile phase source configured to deliver a mobile phase solvent to a first end of a column of an extraction-separation chromatography cartridge within any of the plurality of cartridge wells; and an outlet channel configured to receive solvent from a second end of the column which is opposite the first end of the column. In some embodiments, the cartridge is made of inexpensive materials and processes, allowing the user to consider the cartridge to be disposable.

The above aspect of the present technology can include one or more of the following features. Delivering the mobile phase may include forming a substantially pressure-tight fluid connection between the mobile phase source and the first end of the column. The well-plate may include a reinforcing wall surrounding and supporting the exterior of the cartridge, such as supporting the exterior of the cartridge along the entire length of the cartridge, or supporting a portion of the exterior of the cartridge at the column. The reinforcing wall may include PEEK, PA, PP, metal, or waterjacket including a pressurized fluid. The outlet line may be in fluid communication with a detector. The detector may be a mass spectrometry detector. The system may operate at pressures of at least about 5000 psi (e.g., 7000 psi, 10000 psi, 12000 psi, 15000 psi). The system can include more than one fluidic connections throughout the system (i.e., anywhere between mobile phase source to the detector). Additionally, the system can include one or more frits to secure a stationary phase within a column. In some embodiments, the one or more fluidic connections are tailored to not substantially disperse eluting peaks and to maintain chromatographic efficiency. Similarly, in some embodiments, the one or more frits are tailored to not substantially disperse eluting peaks and to maintain chromatographic efficiency.

The present technology has numerous advantages. The concentration capability aspect makes µSPE suitable for µLC. In off-line SPE the analytes trapped on sorbent are eluted with excess volume of eluent and only a small portion of the eluent is injected on the LC column. However, in an on-line approach the SPE cartridge is eluted directly to a detector or LC column. The sample is eluted from SPE cartridges as a narrow zone without unnecessary dilution. This is preferred in µLC, where the sensitivity of analysis is the primary goal. In some embodiments, the structure of the cartridges is tailored such that they can support off-line loading with on-line elution. In general, the structure of the cartridge provides for pressure connection or high pressure connection of its column to permit on-line elution. In general, to provide the pressure connection, one or more of the following cartridge components can be tailored: (a) mobile phase flow port and/or inlet to the column segment of the cartridge, (b) column wall, (c) exterior of the column segment; (d) outlet and/or elution port from the column segment, or (e) connection port to an outlet line. Tailoring can include, for example, providing a component with a configuration that mates with a connector or a configuration that compresses or clamps components.

The current disclosure provides for disposable cartridges such that the cartridge may be disposed, obviating the need for washing the cartridge and avoiding contamination where a used cartridge has not been washed completely. Some embodiments of the present technology provide for cartridges that are sufficiently low-cost that they may be disposed after one or a few uses. These disposable cartridges provide for separation of "dirty" samples that contain components that would tend to be retained in a cartridge and resist effective cleaning.

The present technology may permit the user to perform a highly accurate, high pressure chromatographic separation on a device, thereby permitting the user to reduce time and delay associated with preparing and washing the sample prior to analysis. Embodiments of the present technology, permit elution on-line and by sealing the ends of the column within the cartridge, low dispersion may be achieved. The present device may also be useful where an extended washing cycle is to be used. The cartridges may also be washed and prepared in bulk before being used to perform separation. Cartridges may be loaded and stored with sample held in the cartridge, for example, in the barrel before washing and/or separation. For example, a number of samples may be prepared in this way to be transported to a laboratory facility for testing. Use of the disposable columns decreases the contamination risk associated with the reuse of a standard column.

BRIEF DESCRIPTION OF THE DRAWINGS

The invention may be more fully understood from the following detailed description taken in conjunction with the accompanying drawings.

DETAILED DESCRIPTION

Certain exemplary embodiments will now be described to provide an overall understanding of the principles of the structure, function, manufacture, and use of the devices and methods disclosed herein. One or more examples of these embodiments are illustrated in the accompanying drawings. Those skilled in the art will understand that the devices and methods specifically described herein and illustrated in the accompanying drawings are non-limiting exemplary embodiments. The features illustrated or described in connection with one exemplary embodiment may be combined with the features of other embodiments. Such modifications and variations are intended to be included within the scope of the present technology.

In general, the present technology is directed to devices and methods that provide for a highly sensitive MS and μLC/MS analysis to be performed. In one embodiment, cartridges are provided with a structure that permits off-line sample loading and on-line elution. In certain embodiments, to provide on-line elution, one or more portions of the cartridge are tailored to support pressurization of the column and in some instances to allow eluate to be sent directly to a detector without unnecessary sample dilution or dispersion. As a result, a highly sensitive MS and μLC/MS analysis can be performed. As used herein, "on-line" refers to operation as a portion of a pressurized flowstream established by and within the system. By contrast, "off-line" refers to operation out of such a pressurized flowstream.

In embodiments, vacuum, positive pressure, or centrifugal forces may be applied to the cartridges to process the samples. Vacuum, positive pressure or centrifugal forces can be used to process about 10-250 μL of sample, trap the analytes of interest, and wash away the undesirable impurities. This could be accomplished with a robotic autosampler or manually by the operator. The loaded μSPE plate can be eluted both in off-line or preferably in on-line mode. In the latter approach the plate is placed into a separate holder/clamp and eluted by a flow stream of mobile phase. This is realized in quick serial fashion; eluent is sent directly into the detector (e.g. mass spectrometer) or for further analysis to μLC. The μSPE device is designed such that the μSPE wells can be eluted without unnecessary sample dilution or dispersion, permitting a highly sensitive MS and μLC/MS analysis.

Figure 1:
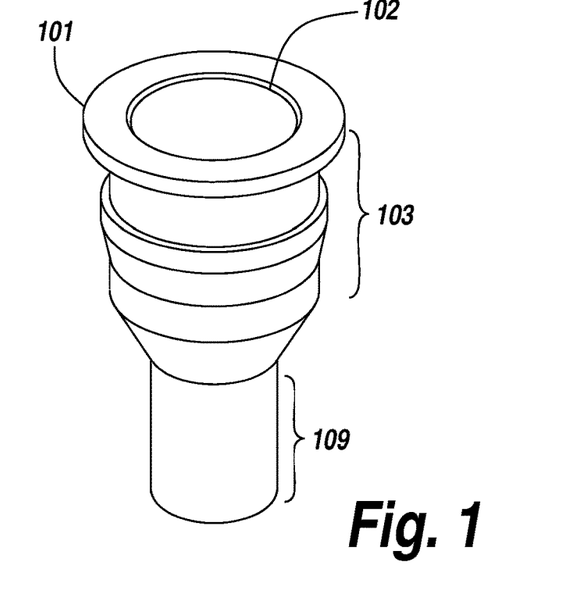
FIG. 1 illustrates a cartridge in accordance with an embodiment of the present technology

An exemplary μSPE cartridge 101 is depicted in FIG. 1. As shown, cartridge 101 is a unitary construction with a barrel section 103 and column section 109 made of the same material. As shown, cartridge 101 has a barrel first end 102 that is open. A sample for sample preparation can be inserted into the barrel section 103 (e.g., for sample washing and for loading onto the column). That is, the interior of the barrel between the barrel first end 102 (see FIG. 1) and the barrel second end 206 (see FIG. 2) may be unfilled and may be configured to receive the sample. Column section 109 includes a column filled with a stationary phase/sorbent (not shown), such as, for example, one or more of the following sorbent materials: C18, phenyl, C8, Bare Silica, Amiopropyl, Amide, Diol, and combinations thereof. The column may have a resolving power of 10 to 2000 theoretical plates. The column disposed within the column section 109 can have any practical size dimension. For example, a column inner diameter may be large as about 10 mm. In general, it will be more practical for smaller inner diameter sizes, such as 5 mm, 4 mm, 2 mm, or 1 mm. The column can be sized to have any practicable length. In some embodiments, the column may have a length of at least 2 mm And, in some embodiments, the length of the column and the inner diameter are correlated to each other. For example, the column may have a length that is at least about 2 times larger than its diameter. Further, the column's inner diameter can be the same size or substantially the same size throughout its length. Alternatively, the diameter can be graduated, such that the diameter either reduces or increases along the length of the column.

Figure 9:
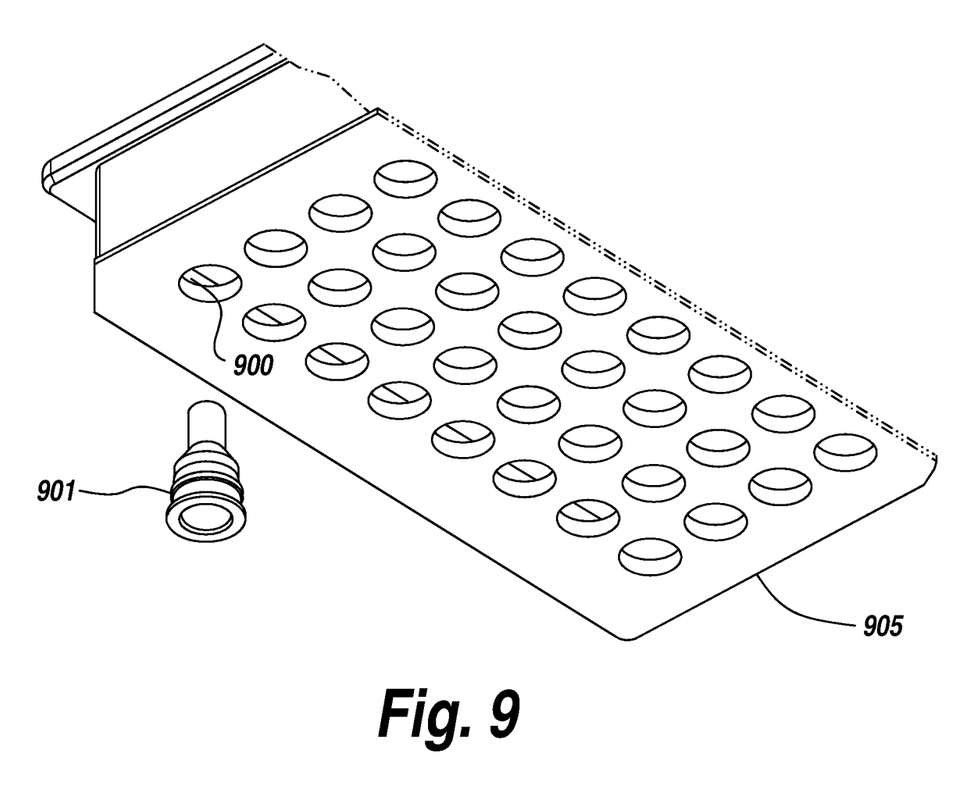
FIG. 9 illustrates a perspective view of a portion of a well plate in which a plurality of cartridges, such as the cartridge shown in FIG. 1, can be inserted.

FIG. 9 illustrates that a plurality of cartridges 101 can be inserted into a plate 120 to hold and disperse each cartridge 101 for analysis.

Figure 2:
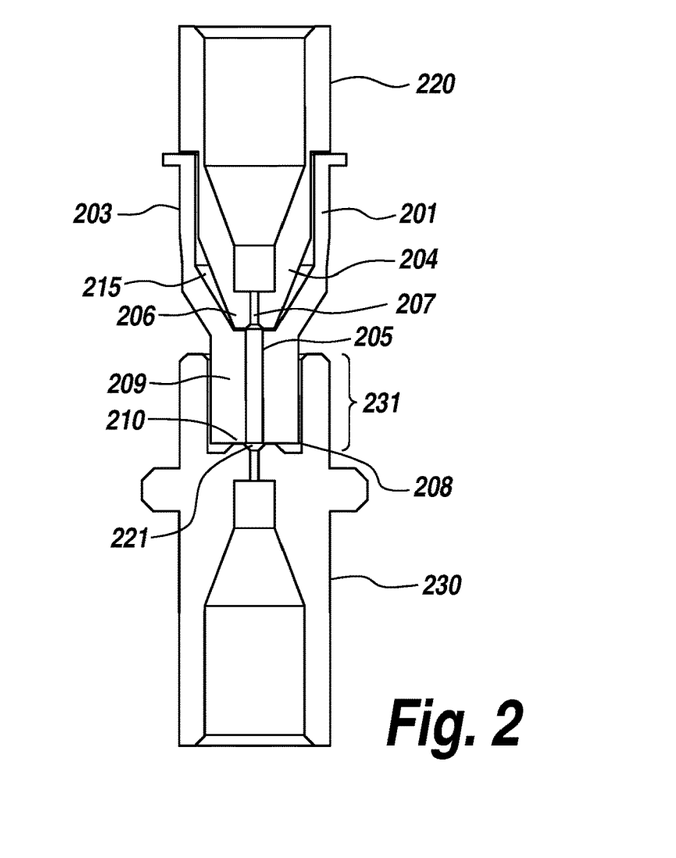
FIG. 2 is a cross-sectional illustration of an embodiment of a cartridge mounted within a portion of an extraction system.

FIG. 2 shows cartridge 201 in use during a chromatographic separation. Cartridge 201 has a barrel 204 within barrel section 203 and a column 205 within column section 209. Solvent source 220 is inserted into the barrel 204 of cartridge 201 such that it bypasses the open volume of barrel 204 and connects directly to first end 207 of column 205. It may be appreciated that the same solvent source 220 could be used to provide a wash solvent into barrel 204 by positioning solvent source 220 higher relative to cartridge 201, such that solvent could be released into barrel 204 to wash a sample and to load the sample onto the column (i.e., prior to chromatographic separation). Alternatively, a different source could be provided for wash purposes.

Outlet 230 is connected to the second end 208 of column 205. Outlet 230 is configured with a fitting 231 that cups the portion of cartridge 201 surrounding column 205, providing additional structural support to the column and avoiding deformation of column 205 and the surrounding cartridge portion when under pressure. That is, fitting 231 reinforces the column segment 209 by supporting the exterior of the column segment 209. Outlet line 221 contains a fluidic connection to the second end 210 of the column 205 to pass directly to μLC/MS analysis.

By providing a direct fluidic connection between the solvent source 220 and the column 205, elution of the sample loaded on the stationary phase can be directly sent to an LC column and/or detector. In order to provide these connections, the column segment 209 is tailored to provide the appropriate structure to withstand pressurization of the mobile flow passing through and/or the pressure of the separation of the sample passing through column 205. In some embodiments, the tailed structure allows for the column segment 209 to withstand pressures of about 5000 psi or greater (e.g., 6000 psi, 8000 psi, 10000 psi, 12000 psi, 15000 psi).

Figure 3:
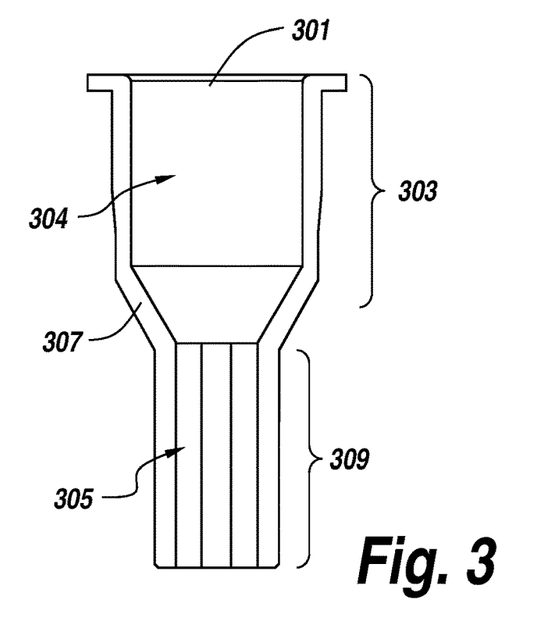
FIG. 3 is a cross-sectional illustration of another embodiment of a cartridge.

Numerous designs can be utilized to provide such a connection. In FIG. 2, outlet 230 includes fitting 231, that cups and secures column segment 209 to provide such a connection. That is, the column segment 209 has been reinforced to provide the pressure-tight connection. In FIG. 3, the structure of the cartridge is tailored in a different way to allow direct connection of the mobile source 220 to the first end 207 of the column for on-line elution. FIG. 3 illustrates a cartridge 301 that is of unitary design (e.g., not detachable) including a barrel section 303 and a column section 309 including a column 305. The cartridge 301 is made of a polymeric material, such as, for example, HDPE, which can be injected molded to provide the appropriate form. To provide for high pressure operation, a tube 305 made of a high pressure material, e.g., a metallic tube or a tube made of high strength polymer (and different from the molded cartridge) can be inserted and secured within the cartridge 301 to provide the unitary design. The column 305 can be secured within by heat shrinking, adhesive, or mechanical slip fit design.

Figure 4:
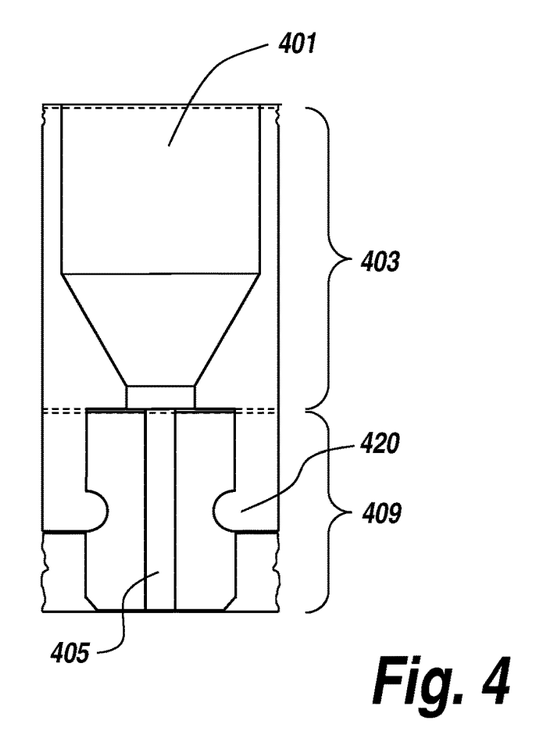
FIG. 4 is a cross-sectional illustration a further embodiment of a cartridge.

FIG. 4 illustrates a detachable barrel and column segments. That is, instead of both the barrel segment and column segments being formed of an integrated single piece of material, the cartridge 401 shown in FIG. 4 is formed of two-pieces made of different materials, which can be separated or detached from each other. The barrel segment 403 includes a clamp 420 that seals the barrel section 403 to the column segment 409. The clamp 420 holds and secures the two pieces together, but can be pressure activated, such that the barrel segment 403 can be removed if desired, especially during on-line elution when the barrel segment 403 is no longer needed (e.g., after sample has been washed and loaded onto the column). Tolerances of the barrel segment 403 and the column segment 409 as well as clamp 420 are highly controlled, such that when barrel segment 403 is clamped to column segment 409, cylindrical portions of the barrel segment and column segment are aligned; i.e., have collinear axes. Using a two-piece design, the column segment 409 can be formed of a high pressure polymer different than that used for the barrel section 403. For example, the column segment 409 could be formed of PEEK to allow high pressure operation (e.g., at 15,000 psi and above). The barrel section 403 can be formed of a different material, such as polypropylene.

Figure 5:
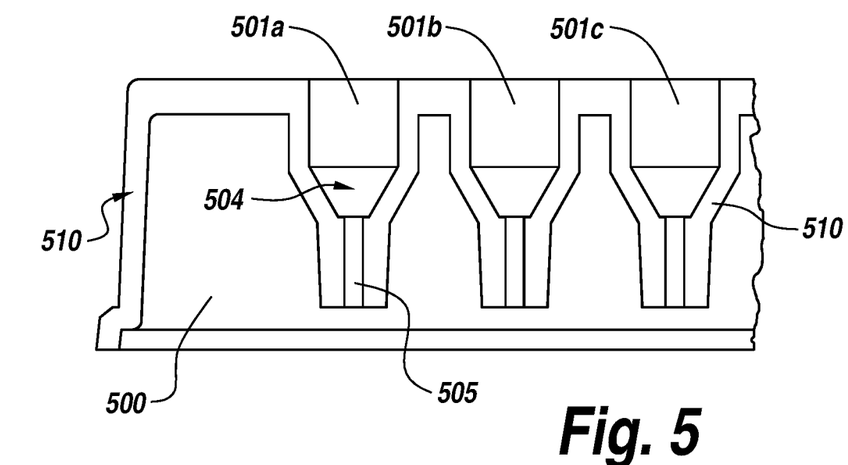
FIG. 5 is a cross-sectional illustration of three cartridges in a well-plate.

FIG. 5 provides another possible cartridge structure in accordance with the present technology, in cross-sectional view. Plate 500 is a one-piece molded polymer structure (such as HDPE) housing multiple cartridges 501a, 501b, and 501c. While FIG. 5 shows three cartridges, any number of cartridges can be included (e.g., 96 cartridges/sample wells). Each cartridge or sample well 501a, 501b, and 501c, includes a barrel 504 and a column 505. To provide reinforcement along the cartridges 501a, 501b, and 501c, a wall or skirt 510 of a reinforcing material is disposed about each cartridge to reinforce the connection between the barrel 504 and the column 505 to support the exterior of the cartridges, thereby avoiding or minimizing deformation of the column or cartridge wall when the cartridge is under pressure.

Figure 6:
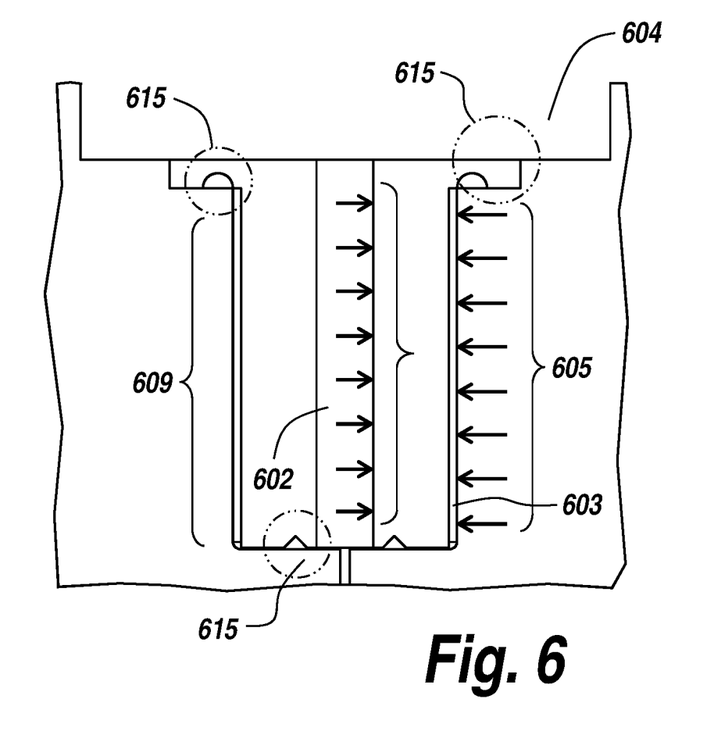
FIG. 6 is a cross-sectional illustration of a column portion of a cartridge with a waterjacket.

Another design that provides additional support to allow on-line elution, is shown in cross-section in FIG. 6. In this embodiment, the column 602 is provided with a clamp, in particular a fluid jacket or waterjacket 605 that distributes pressures around and about the column 602. Waterjacket 605 may be any fluid jacket which may exert pressure (indicated by arrows in FIG. 6, on the column 605 or other component of cartridge 601 in order to maintain the structure of the cartridge. The waterjacket 605 can apply a pressure on an outer surface 603 that is less than or more than the internal pressure of the column 605. That is, the waterjacket 605, can apply a pressure that minimizes any bulging of the column segment 609. When the pressure of the waterjacket 605 is greater than the internal fluidic pressure of column 602, the waterjacket 605 radially compresses the column 602, which may enhance chromatographic performance One or more force concentrators 615 (e.g., notch or cutout) can be included in the column segment 609 to further secure and seal the column segment 609 to the barrel 604.

Figure 7A:
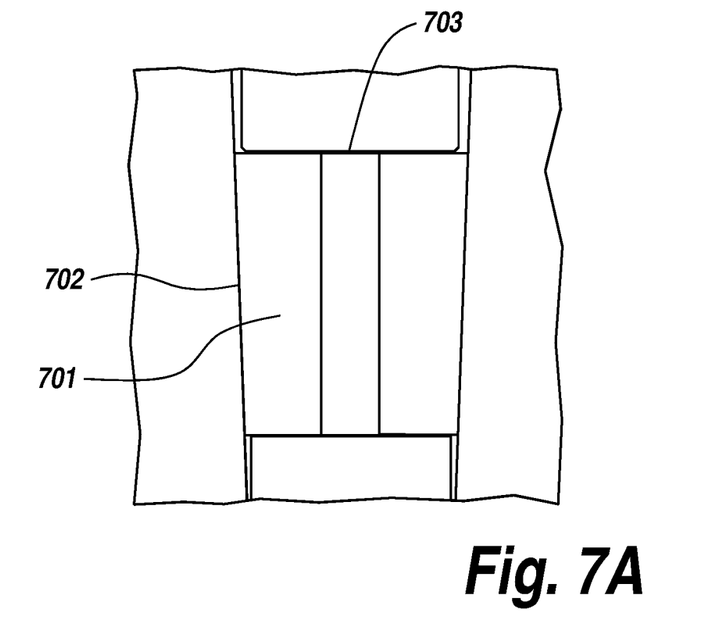
FIG. 7A is a cross-sectional illustration of a column portion of a cartridge with a tapered wall.
Figure 7B:
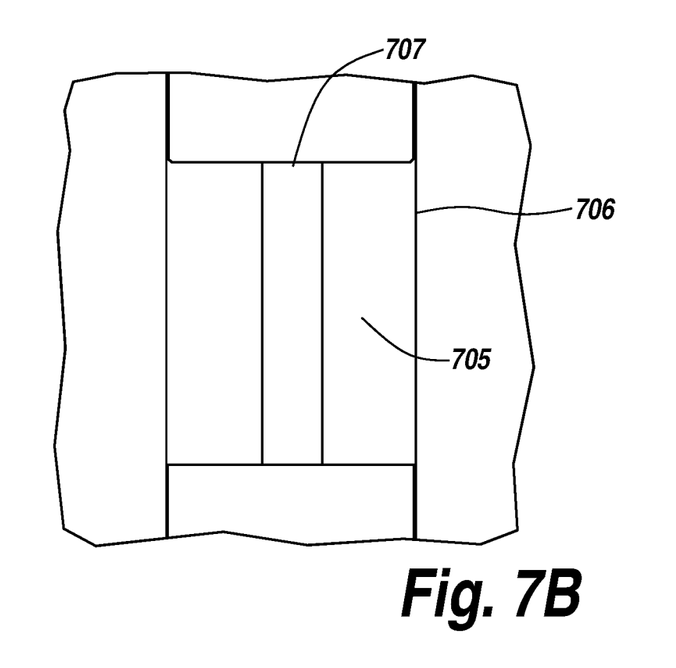
FIG. 7B is a cross-sectional illustration of a column portion of a cartridge straight wall.

Another possible configuration or tailoring of the cartridge to aid in pressure connection is applied to an exterior of the column segment. FIG. 7A shows cartridge 701 in which side walls 702 surrounding column 703 are tapered. By comparison FIG. 7B shows straight-walled cartridge 705, which has straight walls 706 surrounding column 707. Tapered walls may provide advantages to more easily loading the cartridge into a sample well by taking advantage of the narrow portion of the tapered wall. Additionally, the taper may be desirable for the structural strength of the cartridge. The well or fitting (e.g., connection to the column) may be designed to have a reverse taper in order to receive the tapered cartridge while providing a sufficiently tight connection in order to support the cartridge wall.

Alternatively, or in addition to reinforcing components of the cartridge and/or connection to the outlet line (as shown in FIG. 2) to provide enhanced fluidic connections, other cartridge components can be tailored. For example, in FIG. 2, first end 207 of the column 205 can be tailored to enhance the connection to the mobile phase source 220. That is, in certain embodiments, the first end 207 is shaped to mate with a fluidic line providing the mobile phase source 220 to the column 205. Examples of such a shape include tapering the first end 207, or a force fit configuration to seal the column 205 to the line extending from the mobile phase source 220. In addition, the second end 208 of the column 205 can be tailored as well to provide for a pressure-tight fluidic connection to the outlet line 221. An eluate release port 210 designed to mate with the outlet line 221 can provide such a pressure-tight connection. The eluate release port 210 can be shaped (e.g., tapered or force fit configuration) to mate with a line 221 establishing connection to outlet 230.

In some embodiments, fits and/or seals to contain sorbent with the column can be provided. For example, referring to FIG. 2, a frit can be positioned and secured within the column at one or each of its ends 207, 208. One or more seals protecting the sorbent from the environment can also be provided at the column 205 ends 207 and 208. Preferably, frits and seals are included to have a form factor and attachment that does not substantially interfere with fluid flow. That is, it is preferable to attach or include frits that do not substantially disperse eluting peaks nor reduce chromatographic efficiency.

In general, barrel segments in accordance with the present technology and shown in each of FIGS. 1A, 2, 3, 4, 5, and 6, provide an open vessel or unfilled space for washing a sample and/or loading the sample on the column within the μSPE device. Prior to connecting the mobile phase source directly to the loaded column, the sample can be washed or treated before loading. The barrel segment can include a funnel portion, such as funnel portion 215 shown in FIG. 2 to help with loading of the sample into the column.

A sample intended for use in a chromatography separation may include the sample within a matrix having various components. Preparing the sample for use in the chromatography system may include a step of washing the sample, in which a certain solvent is introduced onto the sample material. This solvent may dissolve one or more components of the matrix so that these components may then be removed from the sample container, leaving behind a purified version of the sample. A plurality of wash steps may be used to increase the degree to which undesired components of the matrix are removed or to provide different solvents so that different components of the matrix are removed. The wash may be performed with a variety of solvents, including aqueous and organic solvents, mixtures of solvents, or solvents including dissolved components such as pH modifiers. The solvent may be, e.g., methanol, ethanol, acetonitrile, tetrahydrofuran, dimethoxyethane, chlorobutane, dichlorobenzene, pentanone, acetone, chloroform, cyclohexane, diethyl ether, ethyl acetate, pentane, hexane, heptane, ligroin, toluene, water, and combinations of the same. Additionally, the solvent may be or may include a pressurized gas, such as carbon dioxide, sulfur hexafluoride, chlorofluorocarbon, especially where the pressure and temperature are controlled such that the solvent is maintained in a fluid form at or near the critical point. The mobile phase may also be selected from the foregoing. While the mobile phase and the wash solvent may be the same, it may be noted that preferably the wash solvent will be selected to dissolve components from the matric but not including the sample, in order to leave the sample present for the separation. Additional properties other than the composition of the solvent may be used to favor dissolving either non-sample portions of the matrix, or sample, at the appropriate steps, for example, the temperature, pressure, or duration of the contact with the solution.

As discussed above, washing and loading occurs in the barrel segment. The barrel is an unfilled space that can include a funnel section, such as funnel section 215, shown in FIG. 2. The column segment may comprise a material selected from HDPE (high-density polyethylene), PEEK (polyether ether ketone), PA (polyamide), PP (polypropylene), PVD (polyvinylidene fluoride), ceramic, and metal. The cartridge may additionally comprise a jacket or other reinforcing wall. The jacket surrounding the column or column segment typically includes a material to provide increased pressure resistance to prevent or minimize deformation of the column segment. The jacket may be formed of similar materials to that of the column segment and in some embodiments, can include a pocket of pressurized fluid to counteract fluid forces in the column. An example of a jacket is shown as jacket 231 in FIG. 2. Jacket 231 is integrated into outlet 230, however jacket 231 may also be a separate component of the system. The jacket may be configured around the column segment in order to provide reinforcement to the column and to increase the ability of the column to withstand high pressure. The use of a jacket may provide a particular advantage in that the other portions of the cartridge may be made of a single material at both the column and barrel portions and of a lighter material, reducing the weight, cost, and bulkiness of the structure and permitting a single-material continuous construction, while the jacket may provide necessary structural rigidity to the device allowing high pressure. Additionally, the jacket may be designed to be reusable or to be a component of a tray or holding position of the cartridge. Such an arrangement may reduce the cost and waste associated with the use of the jacket. Another example of a jacket is provided in FIG. 6, in which a pocket of pressurized fluid is used to counteract internal column pressure.

In some embodiments, the column portion of the cartridge may be distinct from the barrel portion of the column. For example, FIG. 3 shows cartridge 301 with barrel 304 and column segment 305, which are made from different materials but are secured together or otherwise not detachable. Column segment 309 includes column 305, which is secured within the column segment 309 having an exterior 307 formed in unison with the barrel segment. FIG. 4 illustrates a two-part cartridge design, in which the barrel segment 403 is detachable from the column segment 409 using clamp 420. A cartridge having separate components may provide various advantages, such as permitting use of a lower-strength material for the barrel and a higher-strength material for the column portion, which may reduce cost and weight of the device. Further, if different barrels and column segments are interchangeable, the system may be more readily optimized for a particular user's needs.

Figure 8:
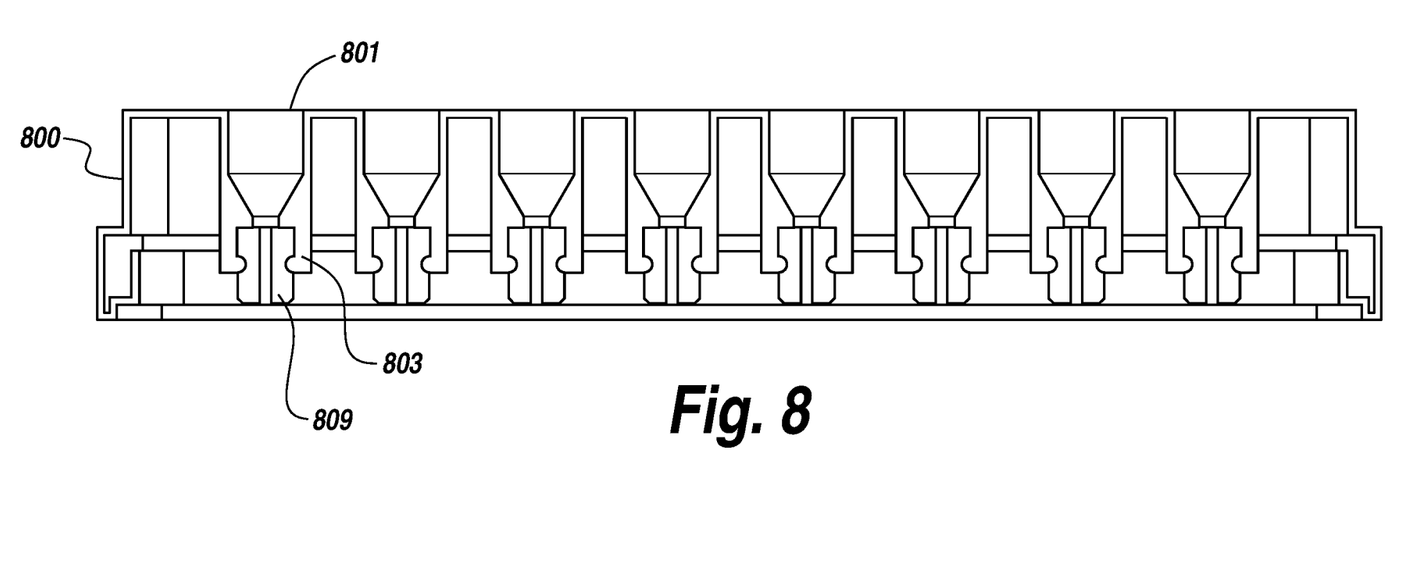
FIG. 8 is a cross-sectional illustration of a well plate having numerous sample wells with detachable column segments.
Figure 10:
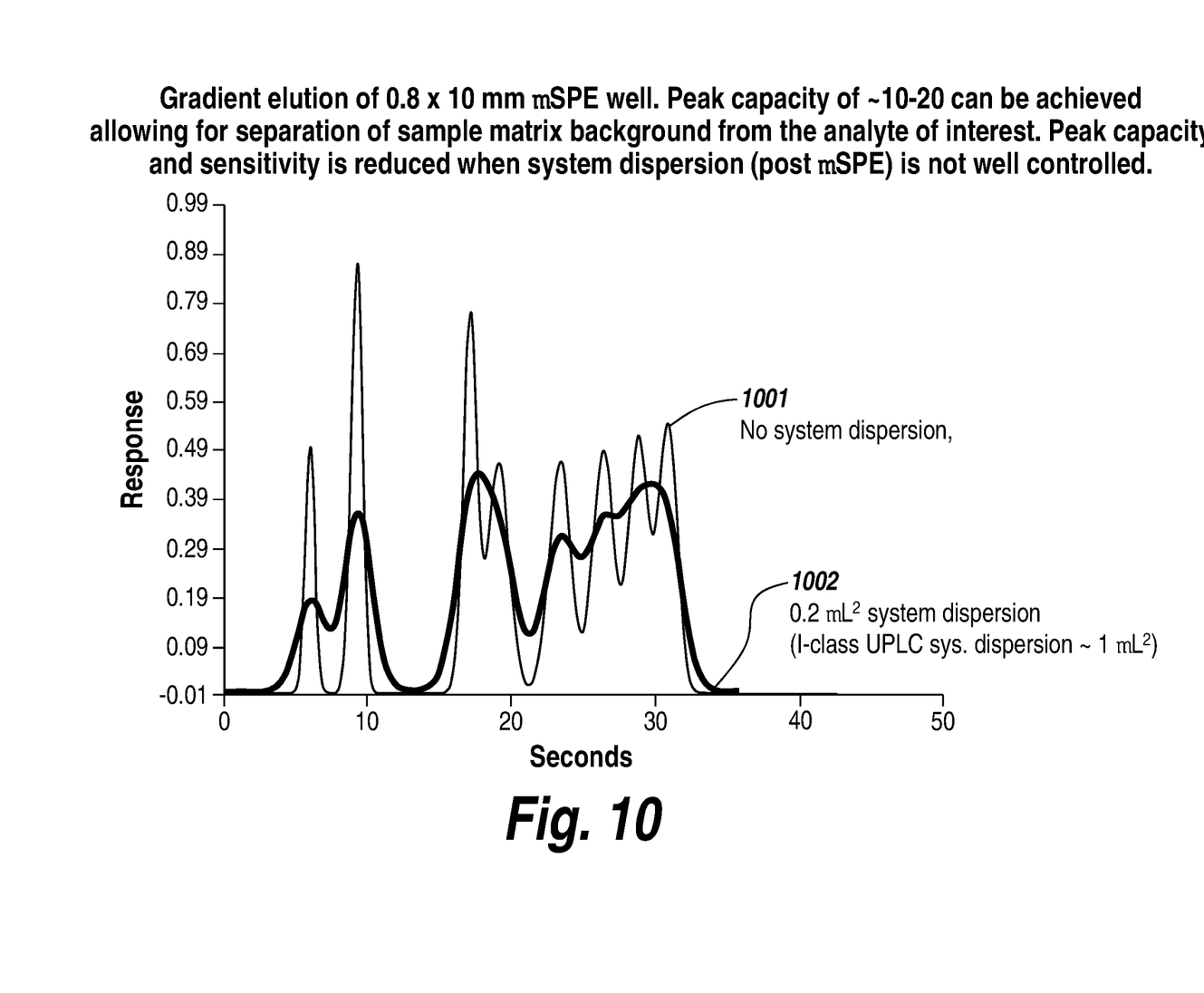
FIG. 10 illustrates a detector response showing minimal and moderate system dispersion.

Another aspect of the present technology is directed to a system utilizing disposable extraction-separation chromatography cartridges, in which the system includes a wellplate comprising a plurality of cartridge wells; a first solvent supply configured to deliver a first solvent to a barrel portion of an extraction-separation chromatography cartridge within any of the plurality of cartridge wells; a mobile phase source configured to deliver a mobile phase solvent to a first end of a column of an extraction-separation chromatography cartridge within any of the plurality of cartridge wells; and an outlet channel configured to receive solvent from a second end of the column which is opposite the first end of the column. The plates can be formed inexpensively in a unitary or possibly a detachable fashion to create disposable μSPE devices. Shown in FIG. 8 is a cross-sectional view of a disposable device 800 including several cartridges or wells 801 with a detachable top or barrel portion 803 from the separation portion 809. In FIG. 9, an embodiment illustrating a plate 905 including openings 910 for inserting one or more cartridges 901 in accordance with the present technology is shown. An advantage of utilizing insertable cartridges into a plate is that the plate can be designed in any desired form (e.g., 96 well plate form, carousel form). Loaded μSPE cartridges within a plate can be eluted both in off-line or preferably in on-line mode. In the latter approach the plate is placed into a separate holder/clamp and eluted by a flow stream of mobile phase. The mobile phase is connected directly to the column to create a pressurized flow through the column for elution. This is realized in quick serial fashion; eluent is sent directly into the detector (e.g. mass spectrometer) or for further analysis to μLC. The μSPE device is designed such that the μSPE wells can be eluted without unnecessary sample dilution or dispersion, permitting a highly sensitive MS and μLC/MS analysis. FIG. 10 shows a gradient elution on a μSPE device in accordance with the present technology. The response shown illustrates that partial separation of analyte from background is possible using the cartridge, as the cartridge acts as a small chromatographic column. The peak capacity in the order of 10-20 can be achieved using a 0.8×10 mm SPE well, see curve 1001. As the SPE device minimizes dispersion, peak capacity and sensitivity is enhanced as compared to a 0.2 μL system following the SPE device (i.e., two order chromatographic separation), which does not control dispersion as well as the devices in accordance with the present technology. Curve 1002 shows the gradient response for the system including the 0.2 μL chromatographic column.

Figure 11:
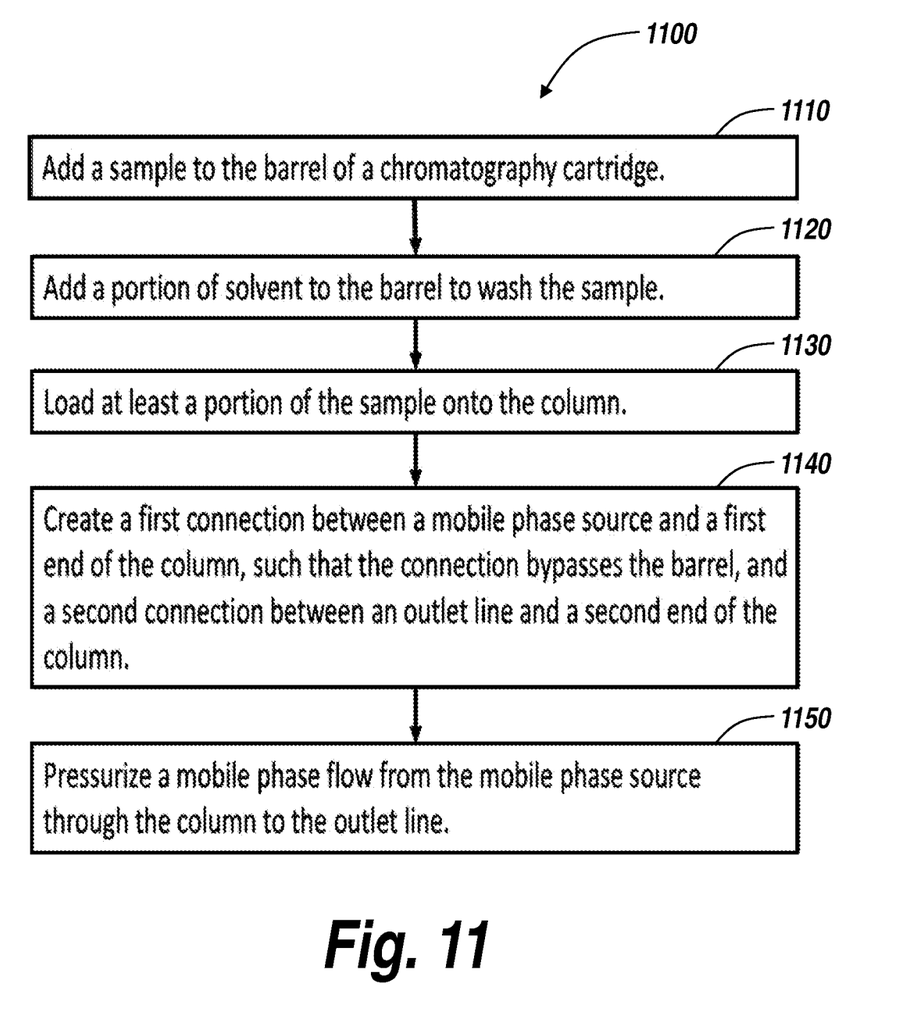
FIG. 11 provides a method according to the present technology.

FIG. 11 shows a method according to the present technology. In general, method 1100 is directed to washing and separation of a sample within a μSPE cartridge. Method 1100 provides direct connection of the mobile phase to the column, thereby bypassing the barrel section. Method 1100 includes several steps. Step 1110 provides for adding a sample to the barrel of the chromatography cartridge. The sample may be added manually or by an automatic sampler device. Step 1120 calls for adding a portion of solvent to the barrel to wash the sample. In some cases, a series of wash steps may be performed to better provide for the washing of the sample. The wash solvent may be removed from the barrel through the column, or may be removed by suctioning the solvent from the barrel to avoid or limit exposure to the column. Step 1130 calls for loading at least a portion of the sample onto the column. Loading may be accomplished by providing solution, which may be under some pressure into the barrel. Additionally, negative pressure may be applied to the opposite end of the column in order to encourage the loading. The sample may be loaded by gravity once the sample has been solvated. In certain embodiments, the mobile phase for the separation may be suitable for loading the column.

Step 1140 calls for creating a first connection between a mobile phase source and a first end of the column such that the connection bypassing the barrel, and a second connection between an outlet line and a second end of the column. Step 1150 calls for pressurizing a mobile phase flow from the mobile phase source through the column to the outlet line. Pressurizing the mobile phase flow through the column permits the chromatographic separation to occur within the column in order to separate the sample which had previously been loaded.

One of ordinary skill in the art will appreciate further features and advantages of the invention based on the above-described embodiments. Accordingly, the invention is not to be limited by what has been particularly shown and described, except as indicated by the appended claims. All publications and references cited herein are expressly incorporated herein by reference in their entirety.

What is claimed is:

1. A cartridge for use in the washing and separation of a sample comprising
    a barrel having a barrel first end that is open and a barrel second end opposite the barrel first end;
    a column segment, having a column segment first end connected to the barrel second end and a column segment second end opposite the column segment first end;
    a jacket in contact with, and surrounding an exterior surface of the column segment, wherein the jacket is capable of withstanding internal pressures of about 5000 psi (345 bar);
    a column spanning the column segment, the column filled with a sorbent material and having a column first end in fluid communication with the barrel second end and a column second end opposite the column first end; and
    a mobile phase source port at the column segment first end and in fluid communication with the column first end.

2. The cartridge of claim 1, wherein the mobile phase source port is configured to form a substantially pressure-tight connection.

3. The cartridge of claim 1, wherein the mobile phase source port is configured to form a substantially pressure-tight connection to a line in fluid communication with a mobile phase source.

4. The cartridge of claim 1, additionally comprising an eluate release port at the column segment second end and in fluid connection with the column second end.

5. The cartridge of claim 4, wherein the eluate release port is configured to form a substantially pressure-tight connection.

6. The cartridge of claim 4, wherein the eluate release port is configured to form a substantially pressure-tight connection with a line in fluid communication with a detector.

7. The cartridge of claim 1 wherein the column segment is reinforced to withstand pressures above about 10000 psi.

8. The cartridge of claim 1, wherein the barrel and the column segment each comprise a cylindrical portion and wherein the cylindrical portions have collinear axes.

9. The cartridge of claim 8, wherein the barrel comprises a funnel portion, the funnel portion between the barrel cylindrical portion and the column segment cylindrical portion.

10. The cartridge of claim 1 wherein the column segment has a radius which decreases from the first end of the column segment to the second end of the column segment.

11. The cartridge of claim 1 wherein the column segment comprises at least one of high-density polyethylene (HDPE), polyether ether ketone (PEEK), polyamide (PA), polypropylene (PP), polyvinylidene fluoride (PVDF), ceramic, or metal.

12. The cartridge of claim 1, wherein the jacket further includes a pocket of pressurized fluid.

13. The cartridge of claim 1, wherein the column segment additionally comprises a first frit at the column first end and a second frit at the column second end.

14. The cartridge of claim 3, wherein the column has a resolving power of 10-2000 theoretical plates.

15. The cartridge of claim 1, wherein the column has a diameter less than or equal to about 10 mm.

16. The cartridge of claim 1, wherein the column has a length of at least 2 mm.

17. The cartridge of claim 1, wherein the column has a length which is at least about 2 times larger than its diameter.

18. The cartridge of claim 13, wherein the first frit and the second frit do not substantially disperse eluting peaks nor retain chromatographic efficiency.

19. The cartridge of claim 1, wherein the barrel, column segment, and mobile phase course port each do not substantially disperse eluting peaks nor retain chromatographic efficiency.

20. The cartridge of claim 1, wherein the jacket comprises at least one of high-density polyethylene (HDPE), polyether ether ketone (PEEK), polyamide (PA), polypropylene (PP), polyvinylidene fluoride (PVDF), ceramic or metal.

* * * * *